(12) United States Patent
Borikar et al.

(10) Patent No.: US 9,760,513 B2
(45) Date of Patent: Sep. 12, 2017

(54) LOW LATENCY EFFICIENT SHARING OF RESOURCES IN MULTI-SERVER ECOSYSTEMS

(71) Applicant: CISCO TECHNOLOGY, INC., San Jose, CA (US)

(72) Inventors: Sagar Borikar, San Jose, CA (US); Prabhath Sajeepa, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 142 days.

(21) Appl. No.: 14/861,866

(22) Filed: Sep. 22, 2015

(65) Prior Publication Data

US 2017/0083466 A1    Mar. 23, 2017

(51) Int. Cl.
| | |
|---|---|
| *G06F 13/36* | (2006.01) |
| *G06F 13/42* | (2006.01) |
| *G06F 13/40* | (2006.01) |
| *G06F 12/02* | (2006.01) |
| *G06F 13/16* | (2006.01) |

(Continued)

(52) U.S. Cl.
CPC .......... *G06F 13/36* (2013.01); *G06F 9/45558* (2013.01); *G06F 12/0223* (2013.01); *G06F 12/1081* (2013.01); *G06F 13/1663* (2013.01); *G06F 13/4068* (2013.01); *G06F 13/4282* (2013.01); *G06F 2009/45579* (2013.01);

(Continued)

(58) Field of Classification Search
None
See application file for complete search history.

(56) References Cited

U.S. PATENT DOCUMENTS

| | | | | |
|---|---|---|---|---|
| 5,928,338 A | * | 7/1999 | Lawman | ............... G06F 13/126 710/10 |
| 7,216,211 B2 | * | 5/2007 | Munguia | ............. G06F 13/4243 711/103 |

(Continued)

FOREIGN PATENT DOCUMENTS

| | | | | |
|---|---|---|---|---|
| CN | 103873489 A | * | 6/2014 | |
| WO | WO 2009120798 A2 | * | 10/2009 | ........... G06F 13/404 |

OTHER PUBLICATIONS

'Secure I/O Device Sharing among Virtual Machines on Multiple Hosts' by Cheng-Chun Tu et al., Copyright 2013 ACM.*

(Continued)

*Primary Examiner* — Steven Snyder
(74) *Attorney, Agent, or Firm* — Polsinelli PC (57) ABSTRACT

A method is provided in one example embodiment and includes receiving by a network element a request from a network device connected to the network element to update a shared resource maintained by the network element; subsequent to the receipt, identifying a Base Address Register Resource Table ("BRT") element assigned to a Peripheral Component Interconnect ("PCI") adapter of the network element associated with the network device, wherein the BRT points to the shared resource; changing an attribute of the identified BRT from read-only to read/write to enable the identified BRT to be written by the network device; and notifying the network device that the attribute of the identified BRT has been changed, thereby enabling the network device to update the shared resource via a Base Address Register ("BAR") comprising the identified BRT.

15 Claims, 5 Drawing Sheets

(51) Int. Cl.
*G06F 12/1081* (2016.01)
*G06F 9/455* (2006.01)

(52) U.S. Cl.
CPC .............. *G06F 2009/45583* (2013.01); *G06F 2009/45595* (2013.01); *G06F 2212/206* (2013.01)

(56) References Cited

U.S. PATENT DOCUMENTS

| | | | | |
|---|---|---|---|---|
| 7,610,431 B1 * | 10/2009 | Watkins | ............ | G06F 13/4022 710/100 |
| 7,613,847 B2 * | 11/2009 | Kjos | ................. | G06F 12/1081 710/22 |
| 7,937,447 B1 * | 5/2011 | Cohen | ............... | H04L 67/1097 709/212 |
| 8,176,204 B2 * | 5/2012 | Riley | ..................... | H04L 45/00 709/238 |
| 8,225,019 B2 | 7/2012 | Asnaashari | | |
| 8,327,083 B2 * | 12/2012 | Jacobs | ............... | G06F 11/0712 711/147 |
| 8,458,368 B2 | 6/2013 | Watkins | | |
| 8,478,916 B2 | 7/2013 | Asnaashari | | |
| 8,521,941 B2 * | 8/2013 | Regula | ................. | G06F 13/404 710/105 |
| 8,732,349 B2 | 5/2014 | Kishore et al. | | |
| 8,806,098 B1 * | 8/2014 | Mandapuram | ...... | G06F 13/4022 710/104 |
| 9,229,892 B2 * | 1/2016 | Mandapuram | ...... | G06F 13/4022 |
| 9,350,632 B2 * | 5/2016 | Skerry | ............... | H04L 43/0823 |
| 9,459,907 B2 * | 10/2016 | Tsirkin | ............... | G06F 9/45558 |
| 9,600,313 B2 * | 3/2017 | Nimmagadda | ....... | G06F 9/5077 |
| 9,626,207 B2 * | 4/2017 | Graham | ............. | G06F 9/45558 |
| 2004/0236923 A1 * | 11/2004 | Munguia | ............. | G06F 13/4243 711/170 |
| 2010/0138616 A1 * | 6/2010 | Banga | ................... | G06F 12/109 711/154 |
| 2011/0029971 A1 * | 2/2011 | Yamasaki | ........... | G06F 9/45558 718/1 |
| 2011/0302349 A1 * | 12/2011 | Griggs | .................... | G06F 13/26 710/311 |
| 2012/0110273 A1 * | 5/2012 | Jacobs | ............... | G06F 11/0712 711/152 |
| 2012/0166690 A1 * | 6/2012 | Regula | .................. | G06F 13/404 710/104 |
| 2013/0226880 A1 * | 8/2013 | Sano | ....................... | G06F 15/17 707/690 |
| 2014/0258577 A1 * | 9/2014 | Egi | ....................... | G06F 13/366 710/113 |
| 2014/0281069 A1 * | 9/2014 | Mandapuram | ...... | G06F 13/4022 710/104 |
| 2015/0074320 A1 | 3/2015 | Galles et al. | | |
| 2015/0074321 A1 | 3/2015 | Galles et al. | | |
| 2015/0074322 A1 | 3/2015 | Galles et al. | | |
| 2016/0085705 A1 * | 3/2016 | Mandapuram | ...... | G06F 13/4022 710/313 |
| 2016/0147551 A1 * | 5/2016 | Tsirkin | ............... | G06F 9/45558 718/1 |
| 2016/0246630 A1 * | 8/2016 | Tsirkin | ............... | G06F 9/45558 |
| 2016/0274923 A1 * | 9/2016 | Harriman | ............. | G06F 1/3203 |
| 2016/0283260 A1 * | 9/2016 | Bacher | ............... | G06F 9/45545 |
| 2016/0314009 A1 * | 10/2016 | Tsirkin | ............... | G06F 9/45545 |

OTHER PUBLICATIONS

'Direct Device Assignment for Untrusted Fully-Virtualized Virtual Machines' by Ben-Ami Yassour et al., copyright 2009 by IBM Corporation.*
'Protection Strategies for Direct Access to Virtualized I/O Devices' by Paul Willmann et al., 2008 USENIX conference.*

* cited by examiner

| | vNIC | BAR IN WHICH SHARED RESOURCE PRESENT | BRT IN WHICH SHARED RESOURCE IS PRESENT |
|---|---|---|---|
| SERVER 0 | vNIC 0 | 1 | 3 |
| SERVER 1 | vNIC 1 | 1 | 4 |
| SERVER 2 | vNIC 2 | 1 | 5 |
| SERVER 3 | vNIC 3 | 1 | 6 |

LOW LATENCY EFFICIENT SHARING OF RESOURCES IN MULTI-SERVER ECOSYSTEMS

TECHNICAL FIELD

This disclosure relates generally to data center network environments and, more particularly, to techniques for achieving low latency efficient sharing of resources among servers in such network environments.

BACKGROUND

A typical data center may include multiple rack servers and blade servers configured to communicate with one another via one or more network connections. Traditional servers make use of network-based sharing using networking protocols such as Common Internet File System ("CIFS"), Network File System ("NFS"), or Apple File System ("AFS"), for example, to communicate with each other. Operation of such protocols is dependent on the underlying network. Additionally, the server OS must be aware of and compatible with the protocol being used in order to communicate over the network. Communication over a network always adds latency, as the complete end-to-end communications path involves the following six layer: (1) application layer, (2) networking stack layer, (3) file system layer, (4) driver layer, (5) adapter layer; and (6) FI, upstream L2 switch layer. This latency renders communication between servers restricted, slow, and dependent on the OS, networking stack features and support matrix. In addition, for servers to share a block of data, the OS must understand the networking protocol and implement synchronization primitives to protect the data. In summary, data sharing over a network connection always incurs latency and is OS-dependent

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving by a network element a request from a network device connected to the network element to update a shared resource maintained by the network element; subsequent to the receipt, identifying a Base Address Register Resource Table ("BRT") element assigned to a Peripheral Component Interconnect ("PCI") adapter of the network element associated with the network device, wherein the BRT points to the shared resource; changing an attribute of the identified BRT from read-only to read/write to enable the identified BRT to be written by the network device; and notifying the network device that the attribute of the identified BRT has been changed, thereby enabling the network device to update the shared resource via a Base Address Register ("BAR") comprising the identified BRT. In some embodiments, the method includes, subsequent to the network device updating the shared resource, returning the attribute of the identified BRT to read-only. Certain embodiments further include, subsequent to the returning the attribute of the identified BRT to read-only, the network element notifying a second PCI adapter of the network element that the shared resource has been updated, wherein the second PCI adapter is associated with a second network device. The second network device may read the shared resource via a BRT assigned to the second PCI adapter associated with the second network device. The network element may be implemented as a virtual interface card. The network device may be implemented as a server. The shared resource may include at least one of a classifier, a flow table, and register space and the PCI device may include a virtual adapter instantiated on the network element.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
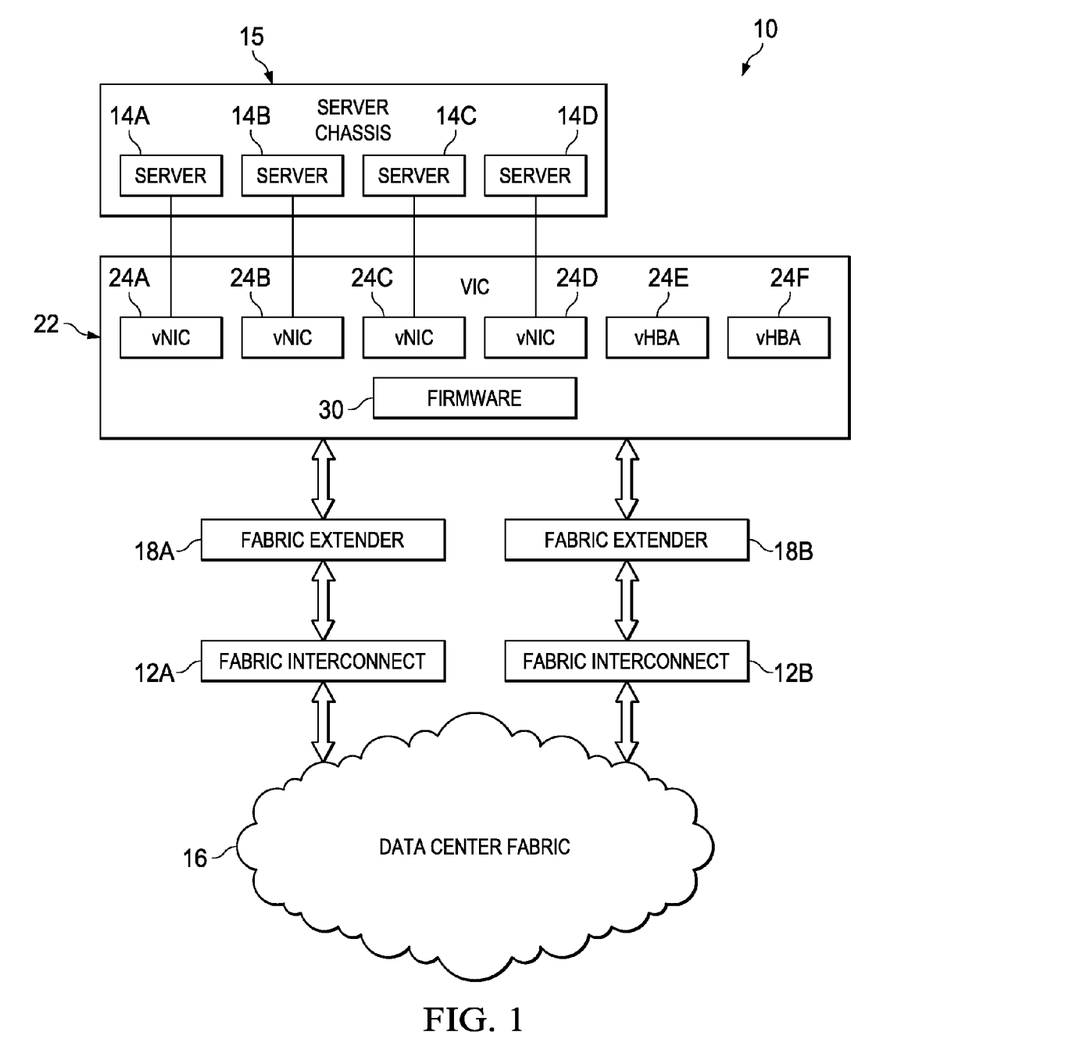
FIG. 1 is a simplified block diagram of a system in which techniques for achieving low latency efficient sharing of resources in a multi-server ecosystem may be implemented in accordance with an embodiment of the present disclosure.

Turning to FIG. 1, illustrated therein is a simplified block diagram of a representative system 10 in which techniques for achieving low latency efficient sharing of resources in multi-server ecosystems may be implemented. As shown in FIG. 1, the system 10 includes a pair of switching devices 12A, 12B, for connecting servers 14A-14D disposed in a server chassis 15 to data center fabric 16. The switching devices 12A, 12B, may be implemented as fabric interconnects, which may be configured to support both FC and Ethernet protocols. Additionally, although not necessary to operation of the system 10, one or more fabric extenders 18A, 18B, may also be provided in the system 10. The primary function of the fabric extenders 18A, 18B, is to increase the number of physical ports available in the system 10, thereby increasing the number of servers 14A-14D that may be connected to the system. The servers 14A-14D may be connected to the switching devices 12A, 12B, either directly or through the fabric extenders 18A, 18B. In particular embodiments, each of the servers 14A-14D may be implemented as a Cisco UCS M-Series modular server available from Cisco Systems, Inc., San Jose, Calif. ("Cisco"), features of which will be described in greater detail below.

In one embodiment, the system 10 is implemented in accordance with the Unified Computing System ("UCS") architecture developed by Cisco. In general, UCS is data center platform that unites compute, network storage access, and virtualization into a single cohesive system designed to decrease implementation costs and increase agility. UCS may support automatic in-band discovery of computers, or servers, and their components, including FC storage adapters. Further, UCS may maintain an inventory of the discovered servers, monitoring the health of the discovered servers. These processes occur without the user being required to enter any device credentials. Additionally, UCS may provide inventory reports to users and provides a role-based access control ("RBAC") system, such that provisioning tasks can be separated, for example between server administrators and storage administrators. A fully redundant UCS system includes two independent fabric planes: Fabric A and Fabric B. Each plane may include a central fabric interconnect connected to an input/output ("I/O") module, implemented as a fabric extender, in each server chassis. The two fabric interconnects are completely independent from the perspective of the data plane. Cisco UCS can function with a single fabric interconnect if the other fabric is offline or not provisioned.

UCS is inherently stateless, with logical configuration specifications referred to as service profiles dictating every aspect of server provisioning, including I/O configurations, firmware revisions, and settings, thereby speeding up virtual infrastructure provisioning. Once created, a service profile can be deployed on any physical server that supports the logical configuration requirements. The service profile may also specify whether to use the world-wide name ("WWN") addresses burned in the server hardware or to substitute virtual WWN addresses therefor. Logical servers can be defined even if no physical server is connected. In this manner, UCS enables logical servers to be deployed over physical servers, which causes the physical server to be configured as specified in the service profile, including WWN addresses for storage adapters. UCS uses a standards-based, low-latency, high-bandwidth 10 Gigabit Ethernet and Fibre Channel over Ethernet ("FCoE") network for all traffic, communications, and storage. UCS thereby simplifies connectivity to the storage array by interconnecting UCS servers as a single system and linking that system directly to the Ethernet and FC aggregation layer.

In one embodiment, the compute component of UCS comprises a powered server chassis and multiple servers. UCS supports a variety of hypervisors, including, for example, VMware ESX and ESXi, both available from VMware, Inc., of Palo Alto, Calif., Hyper-V, available from Microsoft Corporation of Redmond, Wash., and XenServer, available from Citrix Systems, Inc., of Fort Lauderdale, Fla., to name just a few. VMware ESX and ESXi are "bare metal" hypervisors, which run directly on the server hardware without the need for any other software and provide the necessary functions to host several guest OSes on the physical server. Additionally, virtual network interface cards ("vNICs") may employ technology that provides VMs direct access to the server hardware for improved performance and network visibility.

As previously noted, UCS is a stateless computing system. In particular, each compute node has no set configuration. MAC addresses, UUIDs, firmware, and BIOS settings, for example, are all configured via the UCS manager module via service profiles applied to the servers 14A-14D. This enables consistent configuration and facilitates repurposing of servers, as a new service profile can be applied to a server in a manner of minutes.

Referring again to FIG. 1, in accordance with features of one embodiment, system 10 includes a virtual interface card ("VIC") 22, which is a physical adapter that can perform PCIe virtualization by dynamically instantiating PCIe devices on the server. In particular, the VIC 22 can be used to provision more than 100 virtual PCIe adapters, represented in FIG. 1 by adapters 24A-24G, which may comprise virtual network interface cards ("vNICs") 24A-24D and virtual host bus adapters ("vHBAs") 24E-24F, each of which has its own characteristics and can be used for networking or storage. In the illustrated embodiment, several of the adapters (e.g., adapters 24A-24D) comprise vNICs for providing connections to servers 14A-14D, respectively. For purposes that will be explained in detail below, adapter firmware 30 is embedded in and executed by the VIC 22. As previously noted, in one embodiment, the VIC 22 is able to instantiate multiple FC vHBAs (e.g., adapters 24E, 24F) and/or multiple Ethernet vNICs (e.g., adapters 24A-24D) from a single physical adapter (i.e., VIC 22).

UCS M-series modular servers, such as may be used to implement servers 14A-14D, are unique in design in that they include a single VIC, or adapter (e.g., VIC 22), that serves up to 16 physical servers simultaneously. The VIC provides high speed (e.g., 10 Gb/s-40 Gb/s) I/O interfaces, or vNICs, for both network and storage traffic. UCS provides a flexible configuration mechanism to provide different types of vNICs to servers as per user-driven policy. Each of the up to 16 servers is mapped to an individual Peripheral Component Interconnect express ("PCIe") port of the VIC. Individual and unique PCIe addresses isolate the servers from one another to enable the VIC to support all of the servers simultaneously without one having any impact on the others. Embodiments described herein are directed to a mechanism that enables VIC, or adapter, resources to be shared across the servers connected to the adapter. Such adapter resources may include memory, register space, classifiers, flow tables, and host-created custom data structures mapped in adapter memory, for example. In certain embodiments, the adapter supports 2 Gb memory, of which up to 1.5 Gb can be used for sharing purpose based on the other features configured from the UCS manager ("UCSM"), which in certain embodiments is embodied in one or both fabric interconnect 12A, 12B (FIG. 1) at the same time.

UCS M-series servers disaggregate I/Os from the host by using system link technology. In certain embodiments, a VIC includes multiple PCIe interfaces, each of which is used to connect an individual physical server. The PCIe interfaces are separate such that the PCIe subsystem is distinct and non-sharing but remaining blocks of the VIC, such as net block, classifier, flow tables, etc., are shared. As a part of workflow, UCSM embodied in one of the fabric interconnects 12A, 12B (FIG. 1) sends to the VIC the server configuration for each of the vNICs that are to be deployed in the chassis. VIC firmware then prepares the configuration for each vNIC on a server by emulating the configuration space, populating the Base Address Registers ("BARs") for each vNIC. BARs are a range of registers through which resource size requirements may be communicated to each of the servers as per PCI standard.

As will be described in greater detail below, the VIC utilizes BAR Mapping Tables ("BMTs") and BAR Resource Tables ("BRTs") to map BARs to the server. IN one embodiment, BMTs and BRTs are implemented as Ternary Content-Addressable Memory ("TCAM") entries that point to the VIC memory location with proper attributes, such as read permissions, write permissions, size, etc. Each BMT includes a field that indicates how many BRTs are mapped to a BAR. Each BMT represents a BAR in the vNIC. In certain embodiments, a vNIC may include up to three 64-bit BARs or six 32-bit BARs, as per PCI specifications. The BARs are exclusive entries in the vNIC PCI configuration pace, which represents segments of memory locations referred by the size in the BMT.

Figure 2:
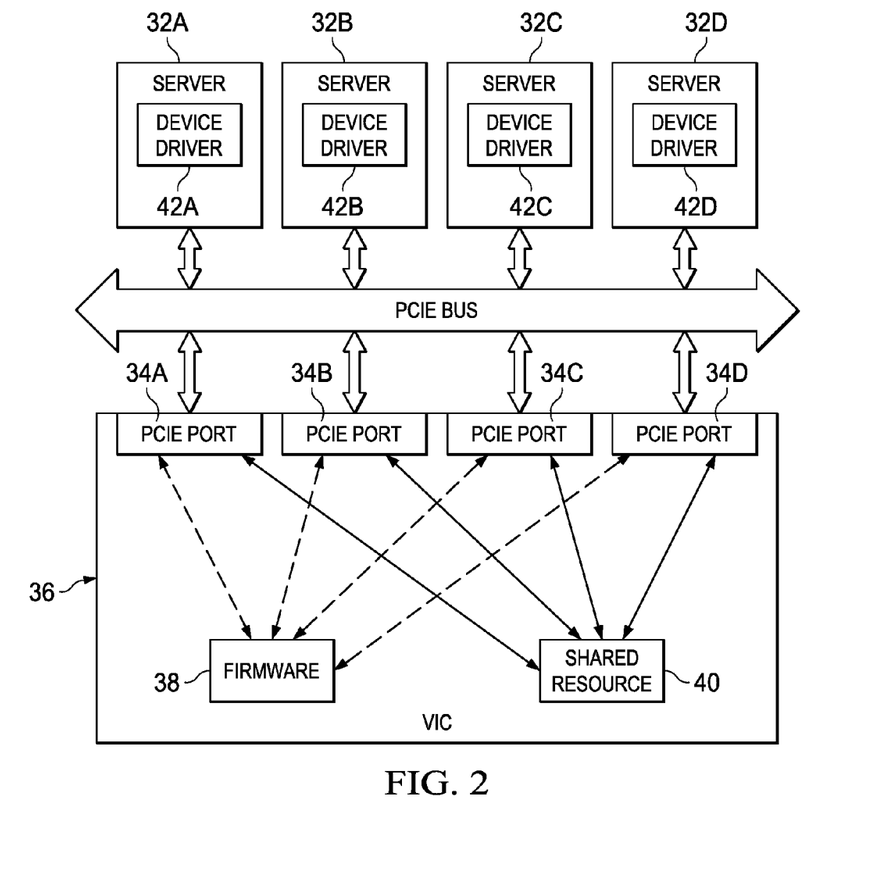
FIG. 2 is a more detailed block diagram of a system in which techniques for achieving low latency efficient sharing of resources in a multi-server ecosystem may be implemented in accordance with an embodiment of the present disclosure.
Figure 2A:
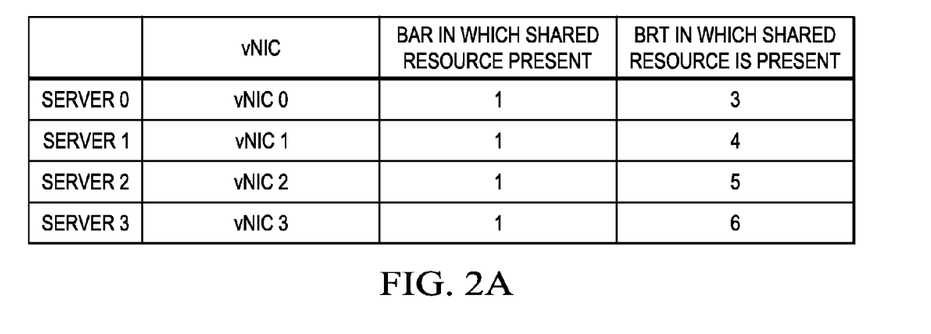
FIG. 2A is a table illustrating example BAR and BRT assignments in association with techniques for achieving low latency efficient sharing of resources in a multi-server ecosystem may be implemented in accordance with an embodiment of the present disclosure.

Each BMT includes several BRTs, each of which represents a different region in the adapter memory. Each BRT has read/write attributes associated therewith that indicate the access permissions for the resource represented by the BRT; for example, a resource may be designated "read-only," in which case data associated with the represented resource may only be read by a device, or "read/write," in which case data associated with the represented resource may be read or written by a device. In certain embodiments described herein, BRTs may be used to share an adapter resource across multiple vNICs each of which is mapped to a different server. Referring now to FIG. 2, illustrated therein is a representative portion of a system 30 in which in which techniques for achieving low latency efficient sharing of resources in multi-server ecosystems may be implemented. As shown in FIG. 2, the system 30 includes four servers 32A-32D each mapped to a respective PCIe interface 34A-34D (or vNIC) of a VIC 36 via a PCI bus 38. In an example embodiment, firmware 38 of the VIC 36 may map a shared resource 40, which for purposes of example will be assumed to be 10 MB of adapter memory to a BAR (e.g., BAR1) of each server 32A-32D. Firmware 38 creates a separate resource type to distinguish the shared resource 40 from other resources presented in the BARs. As illustrated in FIG. 2A, a BAR, such as BAR1, may have multiple BRTs in addition to the shared resource BRT. In accordance with features of embodiments described herein, the shared resource will initially have read-only attributes, or permissions, meaning that servers will not be able to write to the shared resource. As shown in FIG. 2A, in BAR1 of vNIC 0 (associated with server 0), the shared resource is present in BRT3; in BAR1 of vNIC 1 (associated with server 1), the shared resource is present in BRT4; in BAR1 of vNIC 2 (associated with server 2), the shared resource is present in BRT5; and in BAR1 of vNIC 4 (associated with server 4), the shared resource is present in BRT6. The shared resource BRTs (e.g., BRT3 of vNIC 0, BRT4 of vNIC 1, BRT5 of vNIC 2, and BRT6 of vNIC3) will have read-only attributes to begin with.

Device drivers 42A-42D installed on the servers 32A-32D identify the shared resource 40 while discovering the resources mapped in all BARs for the server's vNIC. Each device driver 42A-42D maps the resources into host memory 44A-44D and can make use of this shared resource to communicate with other the other servers as will be described in greater detail hereinbelow. When one of the device drivers, e.g., device driver 42A, wants to update the shared resource 40, it issues appropriate commands to the firmware 38 to request write permissions in connection with the shared resource. The firmware 38 identifies which BRT in the BAR map of the vNIC 34A represents the shared resource. Once the correct BRT is identified, the firmware 38 changes the attributes thereof to read/write and communicates to the driver 42A through a command response. The driver 42A then updates the shared resource via the BAR. Once the operation is complete, the driver 42A sends the update to the firmware 38, which changes the attribute back to read-only and sends an asynchronous event to all vNICs on other servers that have the shared resource in their BAR map (i.e., vNICs 34B-34D). Device drivers 42B-42D of the remaining servers 32B-32D then read the data from the shared resource via the BAR and take appropriate action based on the update.

Using this mechanism, it is possible for one server (e.g., server 32A) to interact with all other servers (32B-32D) in the same chassis without OS awareness or network protocol or networking stack support. Because the transactions occur solely via PCI, the solution is extremely low latency compared to other currently available primitives for sharing/communicating across servers. Firmware may designate any resource as the shared resource and present the resource to the different servers at the same time. Other examples of shared resources may include classifiers, flow tables, or any standard register space that needs to be monitored by different servers at the same time.

Figure 3:
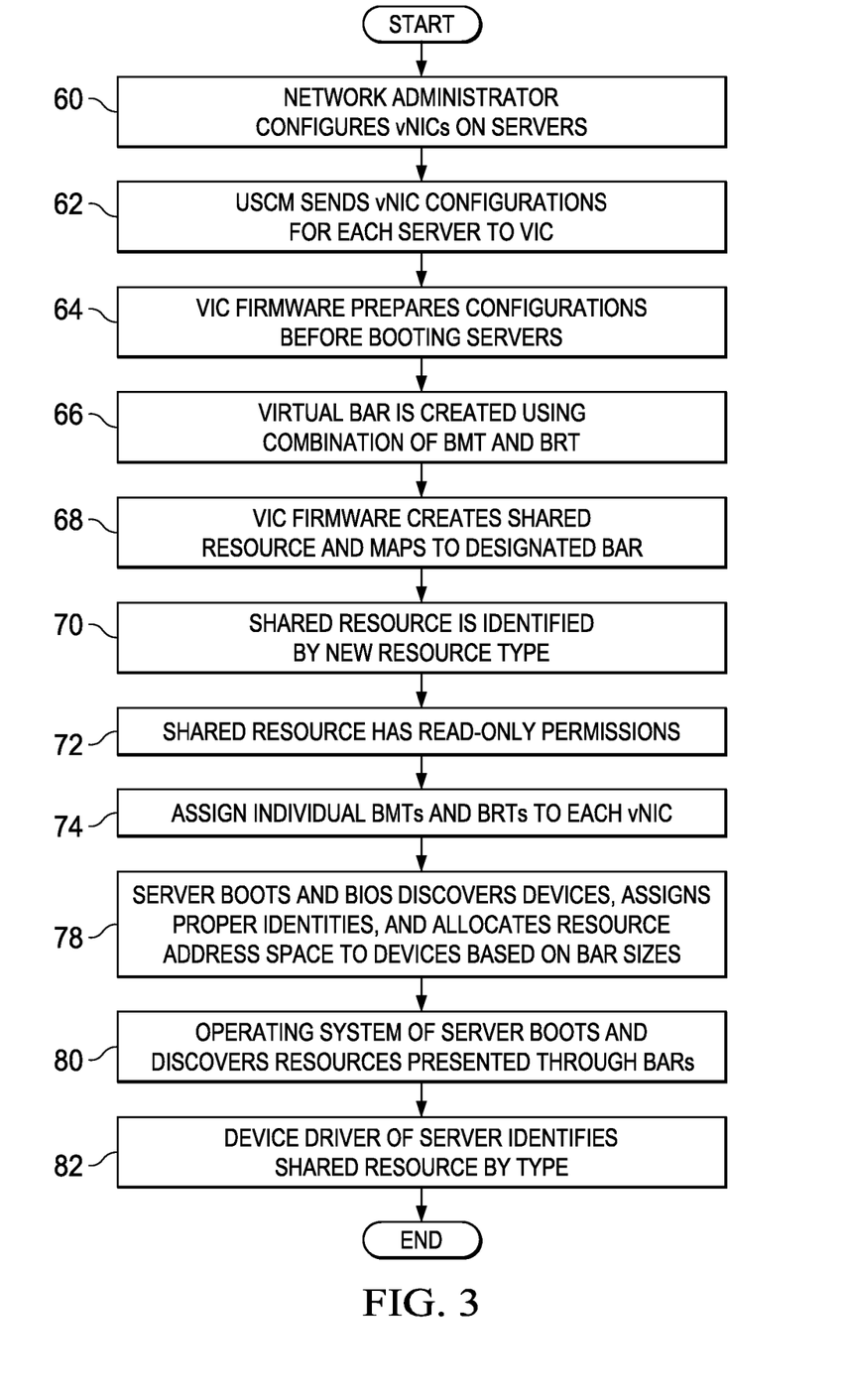
FIG. 3 is a flowchart illustrating operations performed in configuration of a technique for low latency efficient sharing of resources in a multi-server ecosystem in accordance with embodiments of the present disclosure.

FIG. 3 is a flowchart illustrating steps performed in configuration of a technique for low latency efficient sharing of resources in a multi-server ecosystem in accordance with certain embodiments. Referring to FIG. 3, in step 60, an administrator configures vNICs on a plurality of servers via UCSM. In step 62, UCSM sends the vNIC configurations for each server to the VIC. This step may be performed using a custom protocol. In step 64, firmware of the VIC prepares the server configurations before booting the servers. It will be recognized that configurations may include PCI configuration space and mapping the resources in a virtual BAR. In step 66, a virtual BAR is created using the combination of BMT and BRT. As previously noted, and as illustrated in greater detail below with reference to FIG. 5, each BMT entry refers to the BAR and indicates a number of BRTs. Similar types of resources are grouped together in the BRT.

In step 68, the VIC firmware creates a memory region (e.g., a 10 MB memory region) in VIC memory and maps it to a designated BAR (e.g., BAR1). In step 70, a shared resource is identified using a new resource type, which is understood by the device drivers of the servers. In step 72, the shared resource BRT has read-only attributes; no writing to the shared resource is allowed such that if a driver attempts to write to the shared resource, an error will be generated. VIC firmware maps the same shared resource to all the device drivers present on the different servers through different BRTs and different BMTs. In step 74, each vNIC is assigned individual BMTs and BRTs to present different resources from the VIC to the corresponding server. As a result, the same shared resource may reside in different BRTs for different vNICs. In step 78, when a server boots, the server's BIOS discovers all of the devices and enumerates them by assigning them proper identities, such as bus, device, and function numbers, and allocates the resource address space thereto based on the BAR sizes. In step 80, when the OS of a host boots, it loads the device driver, which in turn discovers all of the resources presented through the BARs. In step 82, the device driver identifies the shared resource through special resource type. The device driver parses the metadata present in the shared resource (if any) and prepares itself to communicate with other servers in the same chassis via the shared resource. The metadata may provide details regarding size of the share resource and the number of servers sharing the resource. It will be recognized that each server in the chassis performs the same action by identifying the shared resource and making it ready to communicate with other servers in the chassis.

Figure 4:
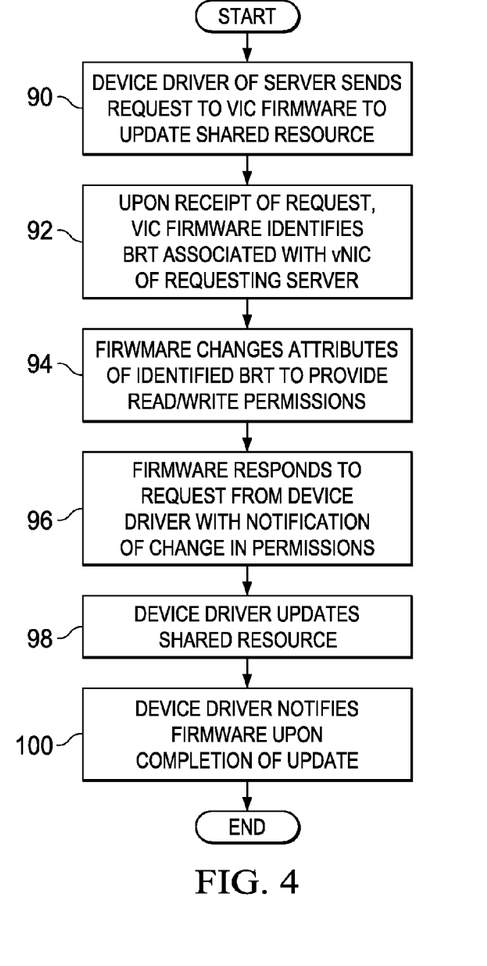
FIG. 4 is a flowchart illustrating operations performed by adapter firmware and server OS in using a shared resource to communicate with other servers in a multi-server ecosystem using a technique for low latency efficient sharing of resources in accordance with embodiments of the present disclosure.

FIG. 4 is a flowchart illustrating operations performed when a first server uses the shared resource to communicate with other servers in the chassis in accordance with embodiments described herein. Referring now to FIG. 4, in step 90, when a server's device driver wants to update the shared resource, the server's device driver sends a request to the VIC firmware indicating that it would like to update the resource and requesting permission to do so. In step 92, the firmware identifies the BRT associated with the vNIC of the server that made the request to update the resource and in step 94, the firmware changes the attributes associated with the identified BRT to provide read/write permission. In step 96, the firmware advises the driver of the change by responding to the previously submitted request. In step 98, the device driver then updates the resource at will. In step 100, when the device driver has completed updating the resource, it notifies the firmware.

Figure 5:
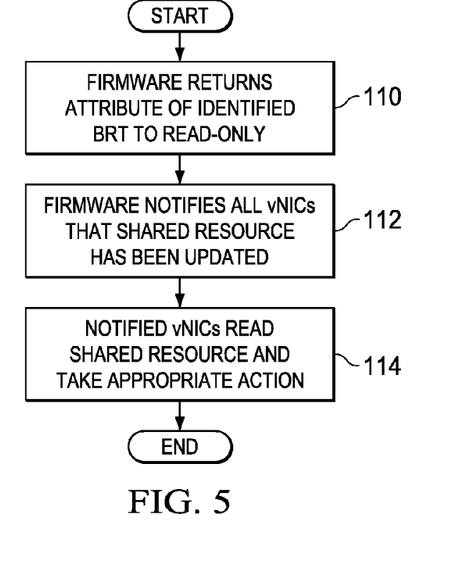
FIG. 5 is a flowchart illustrating operations performed after the shared resource has been updated by a server using a technique for low latency efficient sharing of resources in accordance with embodiments of the present disclosure.

FIG. 5 is a flowchart illustrating operations performed after a server has updated the shared resource in accordance with embodiments described herein. Referring now to FIG. 5, once the device driver notifies the VIC firmware that it has completed updating the resource, in step 110, the firmware returns the attribute of the identified BRT to read-only. In step 112, after the firmware has returned the attribute to read-only, the firmware notifies all of the vNICs that have the shared resource present in their BAR that the resource has been updated. In step 114, the notified vNICs read the resource updates and take appropriate action. For example, the device drivers can read the type of update performed by the server and determine whether the update has any impact on its server. The update could be anything based on the type of resource shared in BAR. Examples of updates include a classifier entries update or flow table entry update. Based on that, the servers will decide whether to install entry for a certain flow or not.

In this manner, the same resource is shared across physically isolated servers through the lowest latency and fastest manner. The techniques described herein also do not require any particular network protocol or OS framework support to communicate across the servers as stated earlier. Also, any shared resource must be guarded by the synchronization primitive.

Figure 6:
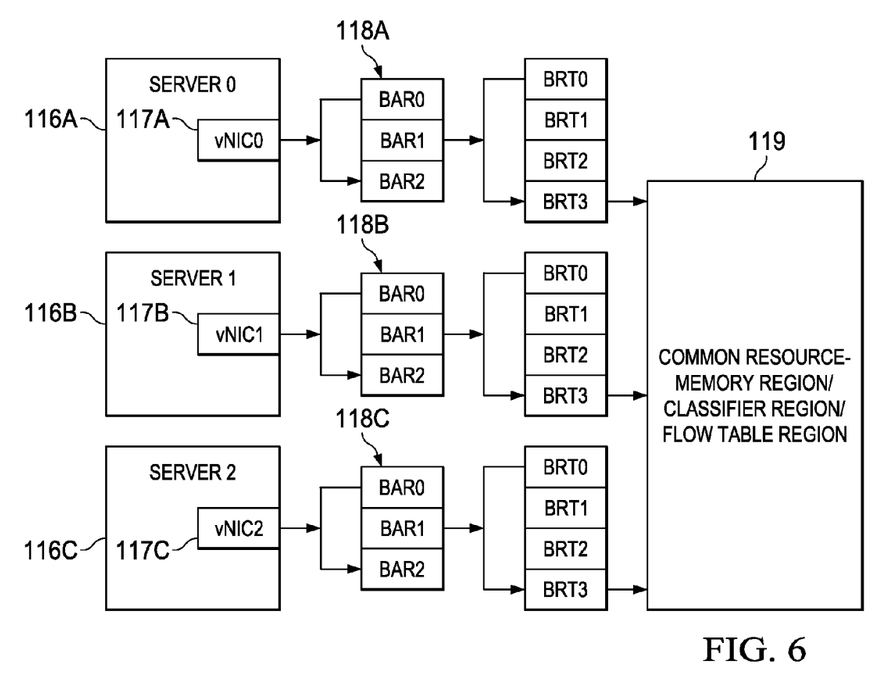
FIG. 6 is a block diagram illustrating a technique for sharing resources using Base Address Registers ("BARs"), BAR Resource Tables ("BRTs"), and BAR Mapping Tables ("BMTs") to accomplish low latency efficient sharing of resources in a multi-server ecosystem in accordance with embodiments described herein.

FIG. 6 illustrates sharing resources using BRTs and BMTs. Referring to FIG. 6, each of three servers 116A-116C, has a vNIC (e.g., vNIC 117A-117C) associated therewith. BMTs 118A-118C comprising three BARs each (BAR0, BAR1, BAR2) are respectively mapped to the vNICs 117A-117C. BAR1 includes four BRTs (BRT0-BRT3). BRT3 is mapped to a common resource 119.

In one example implementation, various devices involved in implementing the embodiments described herein can include software for achieving the described functions. For example, referring to FIG. 2, device drivers 42A-42D and firmware 38 may each comprise software embodied in one or more tangible media implementing device drivers 42A-42D and firmware 38 for facilitating the activities described herein. Each of servers 32A-32D and VIC 36 may also include or have associated therewith a memory device (or memory element) for storing information to be used in achieving the functions as outlined herein, including, for example, BARs, BMTs, and BRTs. Additionally, each of servers 32A-32D and VIC 36 may include a processor capable of executing software or an algorithm (such as embodied in device drivers 42A-42D, firmware 38) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Figure 7:
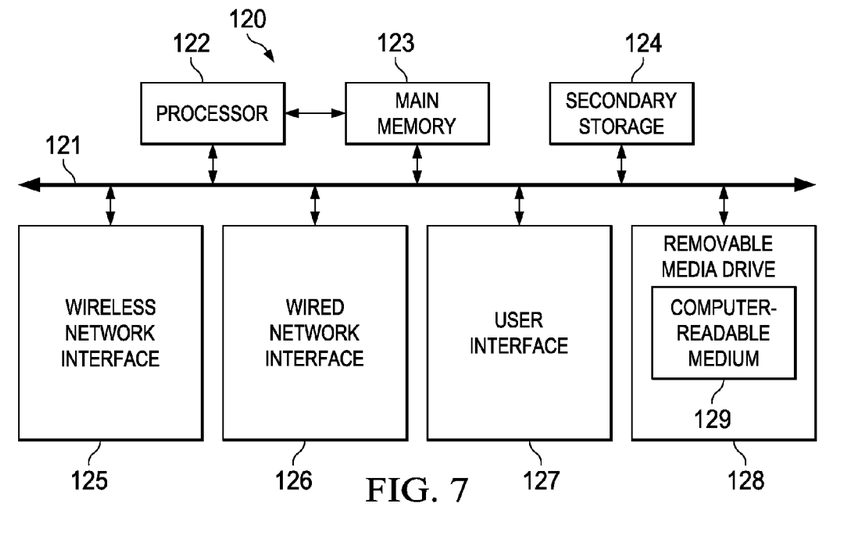
FIG. 7 is a simplified block diagram of a machine comprising an element of systems described herein for enabling low latency efficient sharing of resources in a multi-server ecosystem in accordance with embodiments described herein.

Turning to FIG. 7, FIG. 7 is a simplified block diagram of an example machine (or apparatus) 120, which in certain embodiments may comprise a fabric interconnect, such as fabric interconnects 12A, 12B, a server, such as servers 14A-14D, 32A-32D, and/or a VIC, such as VIC 22, 36, that may be implemented a system for providing low latency efficient sharing of resources in a multi-server ecosystem in accordance with features of embodiments described herein. The example machine 120 corresponds to network elements and computing devices that may be deployed in systems 10 and 30, including, for example, fabric interconnects 12A, 12B, servers 14A-14D, 32A-32D and VIC 22, 36. In particular, FIG. 7 illustrates a block diagram representation of an example form of a machine within which software and hardware cause machine 120 to perform any one or more of the activities or operations discussed herein. As shown in FIG. 7, machine 120 may include a processor 122, a main memory 123, secondary storage 124, a wireless network interface 125, a wired network interface 126, a user interface 127, and a removable media drive 128 including a computer-readable medium 129. A bus 121, such as a system bus and a memory bus, may provide electronic communication between processor 122 and the memory, drives, interfaces, and other components of machine 120.

Processor 122, which may also be referred to as a central processing unit ("CPU"), can include any general or special-purpose processor capable of executing machine readable instructions and performing operations on data as instructed by the machine readable instructions. Main memory 123 may be directly accessible to processor 122 for accessing machine instructions and may be in the form of random access memory ("RAM") or any type of dynamic storage (e.g., dynamic random access memory ("DRAM")). Secondary storage 124 can be any non-volatile memory such as a hard disk, which is capable of storing electronic data including executable software files. Externally stored electronic data may be provided to machine 120 through one or more removable media drives 128, which may be configured to receive any type of external media such as compact discs ("CDs"), digital video discs ("DVDs"), flash drives, external hard drives, etc.

Wireless and wired network interfaces 125 and 126 can be provided to enable electronic communication between machine 120 and other machines (e.g., new device 20, existing device 30, registration server 40, signing authority 60, certification authority 50) via networks (e.g., domain 7, wide area network 5). In one example, wireless network interface 125 could include a wireless network controller ("WNIC") with suitable transmitting and receiving components, such as transceivers, for wirelessly communicating within a network. Wired network interface 126 can enable machine 120 to physically connect to a network by a wire line such as an Ethernet cable. Both wireless and wired network interfaces 125 and 126 may be configured to facilitate communications using suitable communication protocols such as, for example, Internet Protocol Suite ("TCP/IP"). Machine 120 is shown with both wireless and wired network interfaces 125 and 126 for illustrative purposes only. While one or more wireless and hardwire interfaces may be provided in machine 120, or externally connected to machine 120, only one connection option is needed to enable connection of machine 120 to a network.

A user interface 127 may be provided in some machines to allow a user to interact with the machine 120. User interface 127 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 128 represents a drive configured to receive any type of external computer-readable media (e.g., computer-readable medium 129). Instructions embodying the activities or functions described herein may be stored on one or more external computer-readable media. Additionally, such instructions may also, or alternatively, reside at least partially within a memory element (e.g., in main memory 123 or cache memory of processor 122) of machine 120 during execution, or within a non-volatile memory element (e.g., secondary storage 124) of machine 120. Accordingly, other memory elements of machine 120 also constitute computer-readable media. Thus, "computer-readable medium" is meant to include any medium that is capable of storing instructions for execution by machine 120 that cause the machine to perform any one or more of the activities disclosed herein.

Not shown in FIG. 7 is additional hardware that may be suitably coupled to processor 122 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 120 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 120 to appropriately manage the operation of the hardware components therein.

The elements, shown and/or described with reference to machine 120, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, as previously noted, at least some portions of the activities related to the system for low latency efficient sharing of resources in a multi-server ecosystem outlined herein may be implemented in software. In some embodiments, this software could be received or downloaded from a web server, provided on computer-readable media, or configured by a manufacturer of a particular element in order to provide features of embodiments described herein. In some embodiments, one or more of these features may be implemented in hardware, provided external to these elements, or consolidated in any appropriate manner to achieve the intended functionality.

In one example implementation, fabric interconnects 12A, 12B, servers 14A-14D, 32A-32D and VIC 22, 36, are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system for enabling unconfigured devices to securely join an autonomic network, described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 123, secondary storage 124, computer-readable medium 129) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 122) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of system 10, 30, may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by system 10, 30, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of multiple components. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving by a network element a request from a network device connected to the network element to update a shared resource maintained by the network element;
   subsequent to the receipt, identifying a Base Address Register Resource Table ("BRT") element assigned to a Peripheral Component Interconnect ("PCI") adapter of the network element associated with the network device, wherein the BRT points to the shared resource;
   changing an attribute of the identified BRT from read-only to read/write to enable the identified BRT to be written by the network device;
   notifying the network device that the attribute of the identified BRT has been changed, thereby enabling the network device to update the shared resource via a Base Address Register ("BAR") comprising the identified BRT;
   subsequent to the network device updating the shared resource, returning the attribute of the identified BRT to read-only; and
   subsequent to the returning the attribute of the identified BRT to read-only, the network element notifying a second PCI adapter of the network element that the shared resource has been updated, wherein the second PCI adapter is associated with a second network device.

2. The method of claim 1, wherein the second network device reads the shared resource via a BRT assigned to the second PCI adapter associated with the second network device and takes appropriate action based on contents of the shared resource.

3. The method of claim 1, wherein the network element comprises a virtual interface card.

4. The method of claim 1, wherein the network device comprises a server.

5. The method of claim 1, wherein the shared resource comprises at least one of a classifier, a flow table, and register space.

6. The method of claim 1, wherein the PCI adapter comprises a virtual adapter instantiated on the network element.

7. One or more non-transitory tangible media that includes code for execution and when executed by a processor is operable to perform operations comprising:
   receiving by a network element a request from a network device connected to the network element to update a shared resource maintained by the network element;

subsequent to the receipt, identifying a Base Address Register Resource Table ("BRT") element assigned to a Peripheral Component Interconnect ("PCI") adapter of the network element associated with the network device, wherein the BRT points to the shared resource;

changing an attribute of the identified BRT from read-only to read/write to enable the identified BRT to be written by the network device;

notifying the network device that the attribute of the identified BRT has been changed, thereby enabling the network device to update the shared resource via a Base Address Register ("BAR") comprising the identified BRT;

subsequent to the network device updating the shared resource, returning the attribute of the identified BRT to read-only; and subsequent to the returning the attribute of the identified BRT to read-only, the network element notifying a second PCI adapter of the network element that the shared resource has been updated, wherein the second PCI adapter is associated with a second network device.

8. The media of claim 7, wherein the second network device reads the shared resource via a BRT assigned to the second PCI adapter associated with the second network device and takes appropriate action based on contents of the shared resource.

9. The media of claim 7, wherein the network element comprises a virtual interface card.

10. The media of claim 7, wherein the network device comprises a server.

11. The media of claim 7, wherein the shared resource comprises at least one of a classifier, a flow table, and register space.

12. The media of claim 7, wherein the PCI adapter comprises a virtual adapter instantiated on the network element.

13. An apparatus comprising:
a memory element configured to store data; and
a processor operable to execute instructions associated with the data;
wherein the apparatus is configured to:
receive a request from a network device connected to the apparatus to update a shared resource maintained by the apparatus;
subsequent to the receipt, identify a Base Address Register Resource Table ("BRT") element assigned to a Peripheral Component Interconnect ("PCI") adapter of the apparatus associated with the network device, wherein the BRT points to the shared resource;
change an attribute of the identified BRT from read-only to read/write to enable the identified BRT to be written by the network device;
notify the network device that the attribute of the identified BRT has been changed, thereby enabling the network device to update the shared resource via a Base Address Register ("BAR") comprising the identified BRT;
subsequent to the network device updating the shared resource, return the attribute of the identified BRT to read-only; and
subsequent to the returning the attribute of the identified BRT to read-only, notify a second PCI adapter of the apparatus that the shared resource has been updated, wherein the second PCI adapter is associated with a second network device.

14. The apparatus of claim 13, wherein the second network device reads the shared resource via a BRT assigned to the second PCI adapter associated with the second network device and takes appropriate action based on contents of the shared resource.

15. The apparatus of claim 13, wherein the shared resource comprises at least one of a classifier, a flow table, and register space.

* * * * *